(12) United States Patent  
Desoutter et al.

(10) Patent No.: US 12,226,945 B2
(45) Date of Patent: Feb. 18, 2025

(54) METHOD FOR FORMING CONTAINERS FROM PREFORMS CARRIED BY SUCCESSIVE MOULDS

(71) Applicant: DISCMA AG, Zurich (CH)

(72) Inventors: Luc Desoutter, Octeville Sur Mer (FR); Benoit Picot, Octeville Sur Mer (FR); Danie Diesnis, Octeville Sur Mer (FR)

(73) Assignee: DISCMA AG, Zurich (CH)

( * ) Notice: Subject to any disclaimer, the term of this patent is extended or adjusted under 35 U.S.C. 154(b) by 100 days.

(21) Appl. No.: 17/493,511

(22) Filed: Oct. 4, 2021

(65) Prior Publication Data

US 2022/0024108 A1    Jan. 27, 2022

Related U.S. Application Data

(62) Division of application No. 14/768,351, filed as application No. PCT/EP2014/051849 on Jan. 30, 2014, now Pat. No. 11,135,758.

(30) Foreign Application Priority Data

Feb. 18, 2013 (WO) .................. PCT/IB2013/000426

(51) Int. Cl.
*B29C 49/42*     (2006.01)
*B29C 49/36*     (2006.01)
(Continued)

(52) U.S. Cl.
CPC .......... *B29C 49/4205* (2013.01); *B29C 49/36* (2013.01); *B29C 49/06* (2013.01);
(Continued)

(58) Field of Classification Search
CPC .. B29C 49/4205; B29C 49/36; B29C 49/0021
See application file for complete search history.

(56) References Cited

U.S. PATENT DOCUMENTS 3,661,489 A * 5/1972 Moore .................... B29C 49/36
                                                        425/395
3,675,521 A * 7/1972 Ziegler ............. B29C 49/42069
                                                          82/101
(Continued)

FOREIGN PATENT DOCUMENTS

DE         29817897       6/1999
DE       102006004940     8/2007
(Continued)

*Primary Examiner* — Andrew D Graham
(74) *Attorney, Agent, or Firm* — Honigman LLP; Eric J. Sosenko; Jonathan P. O'Brien (57) ABSTRACT

A method for forming containers from preforms. The method includes loading successive preforms into successive molds at a mold loading station, each mold having a mold cavity in the shape of the containers to be produced. The containers being formed in a forming station by injecting a gaseous or liquid fluid into the preform in order to expand the preform and acquires the shape of the container defined by the mold cavity. The steps performed at the mold loading station and the forming station are distinct from each other, and a transferring step occurs at a transferring station arranged between the mold loading station and the forming station where successive molds containing the preforms are transferred from the mold loading station to the forming station.

20 Claims, 6 Drawing Sheets

(51) Int. Cl.
  B29C 49/06    (2006.01)
  B29C 49/12    (2006.01)
  B29C 49/56    (2006.01)
  B29C 49/68    (2006.01)
  B29K 101/12   (2006.01)
  B29K 105/00   (2006.01)
  B29L 31/00    (2006.01)

(52) U.S. Cl.
  CPC .............. *B29C 49/12* (2013.01); *B29C 49/56* (2013.01); *B29C 49/68* (2013.01); *B29K 2101/12* (2013.01); *B29K 2105/258* (2013.01); *B29L 2031/7158* (2013.01)

(56) References Cited

U.S. PATENT DOCUMENTS

| | | | | |
|---|---|---|---|---|
| 3,716,910 A * | 2/1973 | Eggert | ................ | G01M 3/3218 29/33 P |
| 3,741,553 A * | 6/1973 | Moore | .................... | B29C 49/36 373/130 |
| 4,036,925 A * | 7/1977 | Kauffman | ................ | B29C 49/12 425/534 |
| 4,050,876 A * | 9/1977 | Kauffman | ................ | B29C 49/36 425/537 |
| 4,124,668 A * | 11/1978 | Frohn | .................... | B29C 49/16 264/161 |
| 4,479,772 A * | 10/1984 | Kleimenhagen | | B29C 49/42122 425/534 |
| 4,850,850 A * | 7/1989 | Takakusaki | ......... | B29C 49/4205 425/534 |
| 5,098,279 A * | 3/1992 | Effenberger | ........ | B29C 37/0007 425/534 |
| 5,453,000 A * | 9/1995 | Lebensfeld | ............. | B29C 51/20 425/173 |
| 5,525,278 A * | 6/1996 | Krosch | .................... | B29B 13/06 425/DIG. 246 |
| 5,683,729 A * | 11/1997 | Valles | .................... | B65G 47/847 425/534 |
| 5,863,571 A * | 1/1999 | Santais | ............. | B29C 49/42122 425/534 |
| 6,669,461 B1 * | 12/2003 | Taylor | .................... | B65G 47/841 425/537 |
| 8,268,229 B2 * | 9/2012 | Hintermeier | ........ | B29C 49/4205 264/537 |
| 8,647,568 B2 * | 2/2014 | Winzinger | .............. | B08B 3/022 141/234 |
| 2003/0113172 A1 * | 6/2003 | Girotto | ............. | B29C 49/42069 406/191 |
| 2004/0151798 A1 * | 8/2004 | Nava | ................. | B29C 49/42122 425/522 |
| 2004/0185134 A1 * | 9/2004 | Fiorani | .................... | B29C 49/70 425/537 |
| 2004/0238475 A1 * | 12/2004 | Peronek | .................. | B67C 3/242 215/40 |
| 2005/0223988 A1 * | 10/2005 | Behle | ................ | C23C 16/54 118/719 |
| 2006/0099294 A1 * | 5/2006 | Netsu | ................ | B29C 49/42069 425/540 |
| 2006/0113716 A1 * | 6/2006 | Binda | ................ | B29C 66/8322 264/545 |
| 2008/0220115 A1 * | 9/2008 | Galloni | .................. | B29C 49/56 425/540 |
| 2008/0310941 A1 * | 12/2008 | Freire-Diaz | ............ | B65G 23/30 414/225.01 |
| 2009/0214690 A1 * | 8/2009 | Feuilloley | ............. | B29B 13/024 425/174.4 |
| 2009/0273118 A1 * | 11/2009 | Blochmann | ......... | B29C 49/4205 425/534 |
| 2010/0019414 A1 * | 1/2010 | Humele | .................. | B29C 49/74 215/379 |
| 2010/0068329 A1 * | 3/2010 | Lo | ..................... | B29C 49/42122 425/534 |
| 2010/0090376 A1 * | 4/2010 | Litzenberg | ............. | B65G 29/00 425/150 |
| 2010/0108473 A1 * | 5/2010 | Soncini | ................ | B65G 47/846 198/803.3 |
| 2010/0151069 A1 * | 6/2010 | Ng | ....................... | B65G 47/901 425/150 |
| 2010/0187730 A1 * | 7/2010 | Hintermeier | ........ | B29C 49/4205 264/538 |
| 2010/0200362 A1 * | 8/2010 | Gillet | ................ | B29C 49/4205 198/395 |
| 2011/0052744 A1 * | 3/2011 | Meinzinger | ............. | B29C 33/30 29/426.3 |
| 2011/0056172 A1 * | 3/2011 | Klenk | ..................... | B29C 49/64 414/222.01 |
| 2011/0056809 A1 * | 3/2011 | Borgatti | ................ | B65G 29/00 198/803.3 |
| 2011/0117237 A1 * | 5/2011 | Penninger | ............... | B29C 33/26 425/540 |
| 2011/0120840 A1 * | 5/2011 | Schonberger | ....... | B29C 49/4205 198/867.02 |
| 2011/0121497 A1 * | 5/2011 | Borgatti | ............... | B65G 47/847 425/150 |
| 2011/0151047 A1 * | 6/2011 | Borgatti | ................ | B29C 49/36 425/526 |
| 2011/0278134 A1 * | 11/2011 | Voth | ................ | B29C 49/42122 198/478.1 |
| 2011/0287127 A1 * | 11/2011 | Dupuis | ............ | B29C 49/42069 425/524 |
| 2011/0299967 A1 * | 12/2011 | Borgatti | ............. | B29C 49/4205 414/744.5 |
| 2012/0100238 A1 * | 4/2012 | Humele | .................. | B29C 49/78 425/170 |
| 2013/0140745 A1 * | 6/2013 | Preckel | .................. | B41J 3/4073 264/503 |
| 2013/0337099 A1 * | 12/2013 | Cirette | .................... | B29C 49/56 425/161 |
| 2014/0008927 A1 * | 1/2014 | Rousseau | ............. | B25J 15/0028 294/90 |
| 2014/0161920 A1 * | 6/2014 | Winzinger | .............. | B29C 49/48 425/534 |
| 2014/0232045 A1 * | 8/2014 | Winzinger | ........... | B29D 22/003 425/145 |

FOREIGN PATENT DOCUMENTS

| | | | |
|---|---|---|---|
| EP | 2292550 | 3/2011 | |
| GB | 2004805 | 4/1979 | |
| WO | 2001/089791 | 11/2001 | |
| WO | WO-0189791 A1 * | 11/2001 | ......... B29C 49/4205 |

* cited by examiner

METHOD FOR FORMING CONTAINERS FROM PREFORMS CARRIED BY SUCCESSIVE MOULDS

CROSS-REFERENCE TO RELATED APPLICATION

This application is a divisional of U.S. application Ser. No. 14/768,351 filed on Aug. 17, 2015, which is the U.S. national phase of PCT Application No. PCT/EP2014/051849 filed on Jan. 30, 2014, which claims priority to PCT/IB2013/000426 filed on Feb. 18, 2013, the disclosures of which are incorporated in their entirety by reference herein.

TECHNICAL FIELD OF THE INVENTION

The present invention relates to a machine for producing filled and capped containers from preforms of the type comprising at least a mold loading station for loading successive pre-forms into successive molds, each mold forming a mold cavity having the shape of the container to be produced, and a forming station for forming the containers by injecting a gaseous or liquid fluid into the preform contained in each mold in order to expand said preform such that each preform acquires the shape of the container defined by the mold cavity.

The invention also relates to a method for producing a container from a preform using such a machine.

BACKGROUND

It is known to produce containers, such as plastics bottles and similar, from preforms which are transformed into the containers in a mold cavity by injecting a compressible gaseous or incompressible liquid fluid in the preforms.

The preforms are loaded in successive molds carried by a wheel in a forming station comprising means for injecting the fluid in the preforms.

The compressible gaseous fluid is, for example, air which is blown in the preform, possibly combined with an axial stretching rod, extending internally in the preform. In such case, once a container is formed, it is picked up from the mold cavity and moved to the next station at high speed. This forming method is known as blow molding or injection stretch blow molding (ISBM).

The next station is for example a filling station where the container is filled, for example, with water, carbonated water, mixed or not with syrup and/or other additives, carbonated soft drink, fruit juice, dairy product, edible oil, iced tea, or other products. The container is then closed with a lid or a cap at another station. In such case, the forming, filling and capping can be made on a single platform, currently called "combi" or block machine.

For greater compactness of the equipment, improved hygiene and elimination of compressed air, which is of a poor efficiency to produce, incompressible liquid forming is a very advantageous solution. In this case, the incompressible liquid, which is preferably, but not exclusively, the one intended to fill the container, is directly injected in the preform at the forming station and participates in the forming of the container. Similar to forming with a compressible gaseous fluid, it is possibly combined with an axial stretching rod. The container containing the liquid is then moved at high speed to the capping station where a lid or a cap is applied to the container. This forming method is known as hydraulic forming.

In a traditional fashion, the wheel, otherwise known as the carousel, for forming the containers comprises a plurality of molding stations, each station comprising mold holders arranged to open the mold it carries in order to allow the loading of the preform inside the mold, to close and lock the mold once the preform is loaded and to maintain the mold closed and locked during the rotation of the wheel and the forming of the container, and finally to un-lock and open the mold once again to allow the retrieving of the formed container from the mold. Such mold holders are therefore structurally complicated to enable the opening and the closing of the molds and comprise many parts and recesses. Furthermore, in case of hydraulic forming the design of the mold holders is constrained due to the fact that they have to be made in stainless steel or any other non-corrosive material or coating, to cope with the wet environment and the necessary cleaning procedures. The molding stations also have to withstand the inertia at high revolution speed, which not only depends on the wheel diameter, but also on the increased weight compared to air forming because of the product contained in the preforms and formed containers. Furthermore, hydraulic forming requires high forming pressures, for example as high as 50 bars, thus creating a very good print of the container formed, but also creating a very high level of mechanical constraints on the mold holders. The mechanical shocks due to opening and closing of the mold holders also have to be considered when designing these units. All these restrictions make the mold holders very cumbersome, which limits the number of molds carried by the wheel and increases the distance, or pitch, between successive mold holders on the wheel.

Therefore, in order to have a satisfactory throughput at the forming station, it is necessary to increase the speed of rotation of the wheel, which increases the centrifugal force in the wheel and can lead to spilling the fluid injected in the preforms. Indeed, if peripheral speed is too high, at the end of the forming process, when the forming nozzle is moved up, centrifugal force may force the liquid to spill on top of the mold cavities. This is particularly problematic in case of hydraulic forming because the spilled liquid will soil the molding stations and the elements they comprise. The stations are hard to clean due to their complicated structure, and cleaning them implies stopping the rotation of the wheel and therefore reduces the throughput of the forming station. An insufficient cleaning of the stations, mainly of the molds and mold holders can lead to cross-contamination in the hydraulic forming method. Consequently, the speed of rotation of the wheel is necessarily limited in order to avoid the above-mentioned problems.

Also, the empty and the filled containers are transported between the different stations by transporting means carrying the containers by the neck of the containers. The speed of the containers during these transportations has to be as high as possible in order to have a satisfactory throughput. However, such speed can lead to containers distortions and even breakage when said containers are carried by their necks. Therefore, in order to avoid the distortion or breakage problems, the speed has to be limited, which reduces the throughput of the container forming process.

In the case of hydraulic forming, this issue is even more problematic, due to the very high inertia of a filled bottle and the very high accelerations that are needed to transfer the filled and formed bottle to the next operation such as capping. If conventional means such as gripper transfer are used, the bottle can break and lose its shape and content. Such constraints, if they are not overcome, lead to production speeds that are a lot slower than conventional blowing technology, like ISBM, rendering the technology of hydraulic forming non-competitive.

One of the aims of the invention is to overcome the drawbacks mentioned above, by proposing a machine for producing containers having a satisfactory throughput without risking spilling of the fluid injected in the preforms or distortion or breakage of the containers during their transportations.

SUMMARY OF THE INVENTION

To this end, the invention relates to a machine of the aforementioned type, wherein the mold loading station and the forming station are distinct from each other and wherein the machine comprises a transferring station arranged between the mold loading station and the forming stations for transferring the successive molds containing the preforms from the mold loading station to the forming station.

The machine is designed such that the mold loading, unloading, closing and locking/un-locking functions are done in a separate station than the container forming station. The fact that the forming station and the mold loading stations are distinct stations separate from each other eliminates the need of openable mold holders at the forming station. Therefore, the number of molds carried by the wheel of the forming station can be increased since the pitch between two successive molds can be reduced. The throughput of the forming station is therefore improved and the risks of soiling the mold holders are eliminated. Furthermore, in the machine according to the invention, the molds are used not only to define the contour of the container, but also as a carrier of the empty or the filled container throughout the process. The fact that the preforms and formed containers are transported while they are in the molds eliminates the problems due to the transportation of preforms or containers by their necks only. Therefore, there is no risk of distorting or breaking the preforms or containers during their transportations.

According to other features of the invention: the mold loading station, the forming station and the transferring station each comprise a rotating wheel comprising means for carrying successive molds to move them in rotation and the wheels are arranged with their rotational axes in substantial alignment; said transferring station is adapted to reducing the pitch between consecutive molds when transferring mold from the mold loading station to the transfer station; the machine further comprises a mold unloading station in which the molds are opened and the containers formed at the forming station are retrieved from the mold cavity of the successive molds and the mold unloading station shares components with mold loading station; the machine further comprises a closing station arranged between the forming station and the mold unloading station for closing the containers formed at the forming station; and the machine further comprises a second transferring station arranged to transfer the successive molds containing the closed containers from the closing station to the loading and unloading station.

The invention also relates to a method for forming containers from preforms using a machine as described above, the method comprising the following steps: loading the preform in a mold at the mold loading station, then transferring the mold containing the preform from the mold loading station to the forming station via the transferring station, and injecting a gaseous or liquid fluid in the preform at the forming station such that the preform acquires the shape of the container defined by the mold cavity of the mold.

According to another feature of the method, the container formed at the forming station is retrieved from the mold at the mold loading station after the mold has been moved from the forming station to the mold loading station via the transferring station or via another transferring station.

BRIEF DESCRIPTION OF THE DRAWINGS

Other aspects and advantages of the invention will appear upon reading the following description, given by way of example and made in reference to the appended drawings.

DETAILED DESCRIPTION

This invention provides a machine for producing containers, preferably shaped containers, from preforms.

As used herein, the term "container" relates to a container for storing a consumable. Containers have an internal cavity defined by an interior surface of the container walls. The internal cavity defines the storage volume of the container. For beverages, single serve containers having a storage volume from about 100 to about 500 milliliters, multi-serve containers having a volume from about 500 to about 3000 milliliters, as well as large containers having volumes from about 3000 milliliters to about 30 liters and more are generally known. For other applications such as storage of liquid drugs, smaller container sizes are also known. For yet other applications such as fuels, larger container sizes are known. The interior cavity of the container is accessible from the outside through an opening. The opening may be closable by a closure such as a cap or a lid. The closure may be an integral part of the container and movably connected to the outer wall of the container for example by means of a hinge. The closure may also be a separate part that is not permanently attached to the container such as screw top or a crown. The closure may be reversibly attachable to the container for repeated opening and closing of the container. The closure may comprise a movable part that can be moved by the user from an open position to a closed position such as a sports cap.

The shape of the container is defined by the outer surface of the container walls. In principal, the container can have any size and shape. The container may have a top portion including the opening, a bottom portion opposite the top portion, and a center portion connecting top and bottom portion. The dimension from the top portion to the bottom portion of the container is generally referred to as the longitudinal dimension. The container may comprise a neck portion surrounding the opening and a shoulder portion connecting the neck portion with the side walls. The container may comprise a base for placing the container on a surface. The base may form part of the bottom portion. When placed on a surface, the base of the container is in contact with the surface at at least three points. The base may also be in contact with the surface along a standing surface such as a standing ring. The side walls connect the base of the container with the container walls in the top portion.

As used herein, the term "shaped containers" refers to containers offering at least partially resistance against a change in geometric shape. For example, a simple plastic pouch is not a shaped container while a plastic bottle is a shaped container. Shaped containers can virtually take any shape including the shape of a bottle, a canister, a box, a keg, or a barrel. The resistance against deformation by external forces can be different for various parts of the container and in different direction of a container. Many containers, such as bottles, have a longitudinal dimension that is substantially larger than any transverse dimension. Often, the resistance to deformation in the longitudinal direction is much larger than the resistance to change in the transverse direction so that the containers are stackable for bulk transport.

As used herein, the term "consumable" refers to any product that is normally protected or supported by a container when being delivered to or transported by an end user. The product can be in gaseous, liquid, or solid form. Typical solid consumables include food and other items that are perishable or require some level of protection against contamination. Typical liquid consumables include beverages, body care products, home and garden care products, medical fluids, fuels, operating fluids, and the like.

As used herein, the term "preform" refers to any piece of material than may be converted into a container by forcing a fluid medium at elevated pressure into it. The preform may have a hollow body and a neck portion with an opening for accessing the internal volume of the preform. A preform may have a shape similar to that of a test tube being closed at lower end and having the neck with the opening at the upper end. The preform may be made from any suitable plastic materials, such as polyesters, such as polyethylene terephthalate (PET), polyethylene naphthalate (PEN), polyethylene imine (PEI), polytrimethylene terephthalate (PTT), polylactic acid (PLA), polyethylene furanoate (PEF), or polyolefins, such as polyethylene low density (LDPE) or high density (HDPE), polypropylene (PP), or styrene based materials such as polystyrene (PS), acrylonitrile butadiene styrene (ABS) or other polymers, such as polyvinyl chloride (PVC).

The preforms may generally be produced according to an injection molding process and be molded at a site different from the site where the machine for forming containers according to the present invention is located. In a variant, the preform production platform, such as injection molding, compression molding or injection compression, is integrated in the machine. In this case, the perform production process is conducted such that the body of the perform remains as close as possible to its optimal processing temperature, whereas the neck part is kept at a temperature as close as possible to ambient temperature to prevent later distortion. In this case, the heating station can be replaced by the pre-form production platform and the treatment station(s) is placed downstream of the preform production platform. A heating station can however be arranged downstream of the pre-form production platform in order to submit the preforms to an additional thermal conditioning to optimize the heating profile of the preforms and/or to ensure the activation of the decontamination media optionally introduced in the preforms in the treatment step(s).

A suitable process for converting a preform into a container is to provide a heated preform, preferably heated above the glass transition temperature of the preform material, and to force a fluid medium through into the preform at an elevated pressure. The fluid medium then causes the body of the preform to expand. During the expansion, the preform may be placed into a mold such that the body expands until it reaches and conforms to the interior surfaces of the mold. After cooling down, the body of the preform remains in the expanded configuration, now forming a container. By suitable forming the interior surfaces of the mold, the form of the container may be determined. During the expansion of the preform through the opening, the neck portion may remain relatively unchanged. Suitable fluid media for expanding preforms include gaseous media, such as pressurized air (blowing), as well as liquid media, such as water (hydraulic forming or hydroforming).

As used herein, the term "mold" refers to any body having an internal cavity defined by interior surfaces. A mold may comprise an opening for accepting and holding the neck portion of the preform. When the preform is placed into the mold, the opening of the preform can be accessed from outside the mold. A mold generally comprises at least two complementary parts which can be moved from a first closed configuration to a second open configuration. The preform is expanded when the mold parts are in the closed configuration such that the closed mold limits the expansion of the preform to the desired container geometry. In the opened configuration, the preform can be placed into the mold cavity and the finished container can be removed after the expansion. A mold may comprise further parts such as a base mold which is longitudinally movable with respect to the above mentioned complementary parts and contains the imprint of the container base.

The mold may comprise suitable locking means for locking the mold in the closed configuration in order to avoid opening of the mold during the expansion of the preform. The locking means can take the form of a ring which can be arranged around the mold when the mold is closed. Preferably the locking means comprises a first locking means for locking the upper portion of the mold and a second locking means for locking the lower portion of the mold. The locking means may comprise two rings which are arranged around the upper part and the lower of the mold respectively. Preferably, the locking means and the mold are configured such that the locking means is carried by the mold when the mold is locked with it.

In the following description, the machine and method according to the invention will be described in relation with a hydraulic forming method of containers. However, it is to be understood that the invention is not limited to hydraulic forming and can also be applied to air forming of containers.

In the description, the terms "upstream" and "downstream" are defined relative to the direction of circulation of the preforms and of the formed containers in the machine according to the invention.

The machine of the present invention comprises a plurality of molds for converting preforms to containers. By providing a plurality of molds, the machine of the present invention is able to convert preforms into containers at a higher throughput because the conversion of a plurality of preforms can be handled in parallel as follows. A first heated preform is placed into the first mold. While the expansion of the first preform is started, a second heated preform is loaded into the second mold and so forth. The first mold is used again after the previous container has been removed from it. To allow parallel expanding of preforms in a plurality of molds in a continuous process, the individual molds may be transported along a closed-loop manufacturing path. The time required for expanding the heated preform and removing the container cannot be shortened below a certain value, taking into account some mechanical limits of the equipment or some technical constraints due to the plastic material itself. Accordingly, each mold can only be used a limited number of times per hour. Further increasing the throughput of the machine thus requires using more molds and using them in parallel. To accommodate the increased number of molds, the manufacturing path has to be extended and the molds have to be transported along the manufacturing path at a higher speed.

The machine of the present invention comprises a mold loading station for placing successive preforms into successive molds, each mold forming a mold cavity having the shape of the container to be produced.

The mold loading station may comprise a mold transportation means for transporting the successive molds along a manufacturing path. The transportation means may be in the form of a wheel rotating around its central rotational axis and transporting the molds along its circumference. The transportation means may comprises suitable holding means for holding molds along its circumference. The transportation means may also be a chain for transporting a plurality of molding means. The mold loading means may comprise means for moving the molds from the open configuration to the closed configuration. The mold loading means may comprise means for moving the molds from the closed configuration to the open configuration. The means for moving the molds may be integrated with the holding means or may be distinct from the holding means. The transportation means may comprise means for locking and unlocking the molds in the closed configuration.

The preforms are preferably transported with their longitudinal axis parallel to the rotational axis of the transportation means, yet more preferably with their longitudinal axis in the vertical position.

Preferably, the preforms are supplied to the mold loading station in a form ready for being expanded such as by having a temperature above the glass transition temperature of the preform material. The preforms may be supplied from a heating station comprising a transportation means for transporting the preforms through the heating station along a predetermined path in a continuous process. Suitable heating stations such as ovens for preparing and supplying heated preforms are well known.

Optionally, before undergoing the heating step described before, the preforms can be decontaminated or cleaned, for example to remove dust, or exposed to ultraviolet radiations or submitted to combined or successive treatments. In this case, the machine may comprises one or several appropriate station(s) for performing this or these treatments located upstream of the heating station. The heating station can then be arranged to apply a temperature profile ensuring the activation of the decontamination media optionally introduced in the preforms in the treatment step(s).

The machine of the present invention further comprises a forming station for forming the containers by injecting a gaseous or liquid fluid into the preform contained in each mold in order to deform said preform such that each preform acquires the shape of the container defined by the mold cavity.

The forming station may comprise a mold transportation means for transporting the successive molds along a manufacturing path. The transportation means may be in the form of a wheel rotating around its central rotational axis and transporting the molds along its circumference. Preferably, the rotational axis of the transportation means of the forming station is substantially parallel to the rotational axis of the transportation means of the mold forming station. The transportation means may comprises suitable holding means for holding molds along its circumference. The transportation means may also be a chain for transporting a plurality of molding means.

The forming station may comprise a nozzle for engaging with the opening of the preform contained in the mold and for injecting the pressurized fluid into the preform causing it to expand. The forming station may comprise a plurality of such nozzles successively engaging with preforms contained in successive molds.

For the forming station and its reliable operation, a rotational or track speed of the mold holders along the manufacturing path which is as low as possible is desired. The minimum possible speed for a continuously operating machine is determined by the combined width of the molds divided by the process time for one conversion in a mold. The width of each mold is the width of the widest configuration of the mold which is in the open configuration for inserting the preform and removing the container.

The open configuration is only needed for some time when the mold is loaded and un-loaded in the mold loading station. During the forming step when the mold is in the forming station, the mold has to remain in the closed configuration. Accordingly, it is possible to arrange successive molds with a smaller separation (pitch) in the forming station as compared to the loading station. The forming station can thus operate at a lower rotational or track speed of the molds while still having the same throughput as the mold loading station.

The machine of the present invention comprises a forming station that is distinct from the mold loading station. Preferably, the forming station has a smaller pitch than the mold loading station. Preferably, the forming station operates at a lower rotational or track speed than the forming machine.

The machine comprises a transferring station for transferring successive molds from the mold loading station to the forming station. The transferring station may comprise mold holders for holding and transporting molds. The transferring station can be in the form of a star wheel having a plurality of radial arms having mold holders at their distal ends. The transferring station is arranged such that the mold holders may receive molds from the mold loading station and such that the mold holders may release the molds to the forming station. Preferably, the pitch of the transferring station when receiving the molds is substantially similar to the pitch of the mold loading station when releasing the molds. Preferably, the pitch of the transferring station when releasing the molds is identical to the pitch of the forming station receiving the mold. The transferring station may comprise means for reducing the pitch between successive molds. A suitable means for reducing the pitch is an actuator moving the arms of the star wheel such that the pitch to the preceding mold is reduced. For example the arms may be rotated around the same central rotational axis as the wheel of the transferring station, thereby reducing the angular distance between two successive molds. After releasing the mold to the forming station, the pitch between the two successive molds holder may be increased again, preferably by the same means, so that the pitch adjusted gain for receiving the molds from the mold loading station.

The machine of the present invention may further comprise a mold unloading station in which the molds are opened and the formed containers are retrieved from the mold cavity of the opened successive molds. Preferably, the mold unloading station is unitary with the mold loading station in substantial aspects and shares components. Preferably, the mold loading stations is configured such that it can also perform the function of the mold unloading station. Preferably, the mold loading station performs the steps of unloading and loading the mold while the mold is being held in the same mold holder. Preferably, the same mold holder is transported by the same transportation means during the unloading and loading of the mold.

The machine of the present invention may further comprise a closing station for closing the containers formed at the forming station, preferably while the containers are still being held inside the mold. Preferably, the closing station is arranged between the forming station and the mold unloading station. The closing station may comprise means applying a lid to the neck portion of the container. The closing station may comprise transportation means for transporting the molds along the manufacturing path. The transportation means may be in the form of a wheel rotating around its central rotational axis and transporting the molds along its circumference. The transportation means may comprises suitable holding means for holding molds along its circumference. The rotational axis of the transportation means may preferably be substantially parallel to some or all other rotational axes of the machine. The transportation means may also be a chain for transporting a plurality of molding means.

The closing station also operates best when the rotational or track speed of the molds is as low as possible. Accordingly, the closing station preferably has a smaller pitch than the mold loading station, and yet more preferably the same pitch as the forming station.

The machine of the present invention may comprise a second transferring station for transferring the successive molds from the closing station to the mold unloading station. The second transferring station may comprise mold holders for holding and transporting molds. The second transferring station can also be in the form of a star wheel having a plurality of radial arms having mold holders at their distal ends. The second transferring station is arranged such that the mold holders may receive molds from the closing station and such that the mold holders may release the molds to the mold unloading loading station. Alternatively, for example when no closing station is present, the mold holders of the second transfer means may receive the molds from the forming station. Preferably, the pitch of the second transferring station when receiving the molds is substantially similar to the pitch of the closing station or the forming station when releasing the molds. Preferably, the pitch of the second transferring station when releasing the molds is identical to the pitch of the mold unloading station receiving the mold. The transferring station may comprise means for increasing the pitch between successive molds. A suitable means for increasing the pitch is an actuator moving the arms of the star wheel such that the pitch to the preceding mold is increased. For example the arms may be rotated around the same central rotational axis as the wheel of the transferring station, thereby increasing the angular distance between two successive molds. After releasing the mold to the mold unloading station, the pitch between the two successive molds holder may be reduced again, preferably by the same means, so that the pitch is adjusted again for receiving the molds from the closing station or the forming station.

In the following, the machine and process of the present invention are described with reference to more specific embodiments and the figures. It is to be understood that, while some features may be described only in connection with one embodiment, these features may be readily transferred to some or all embodiments of the invention.

Figure 1:
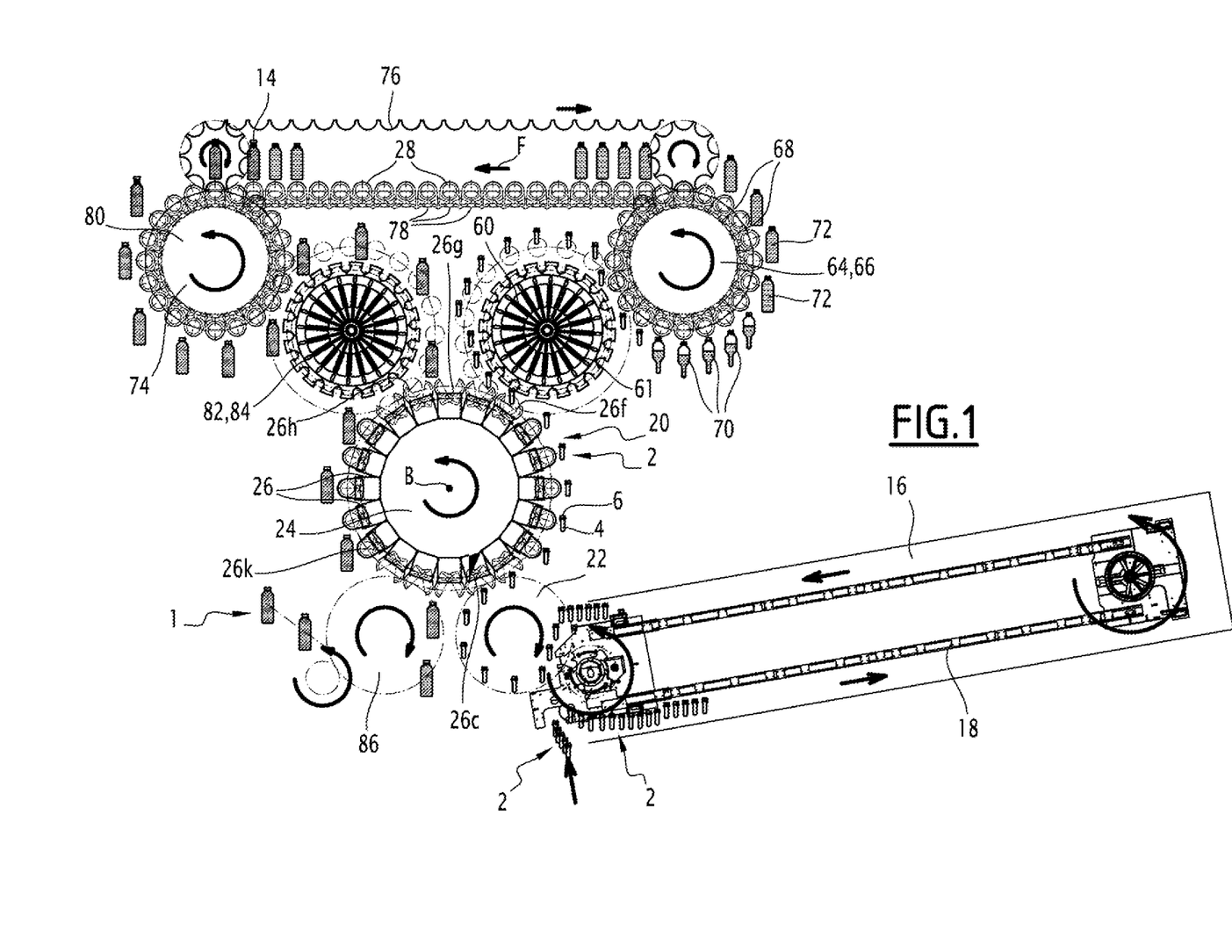
FIG. 1 is a diagrammatical view from above of a machine for forming containers according to one embodiment of the invention.
Figure 2:
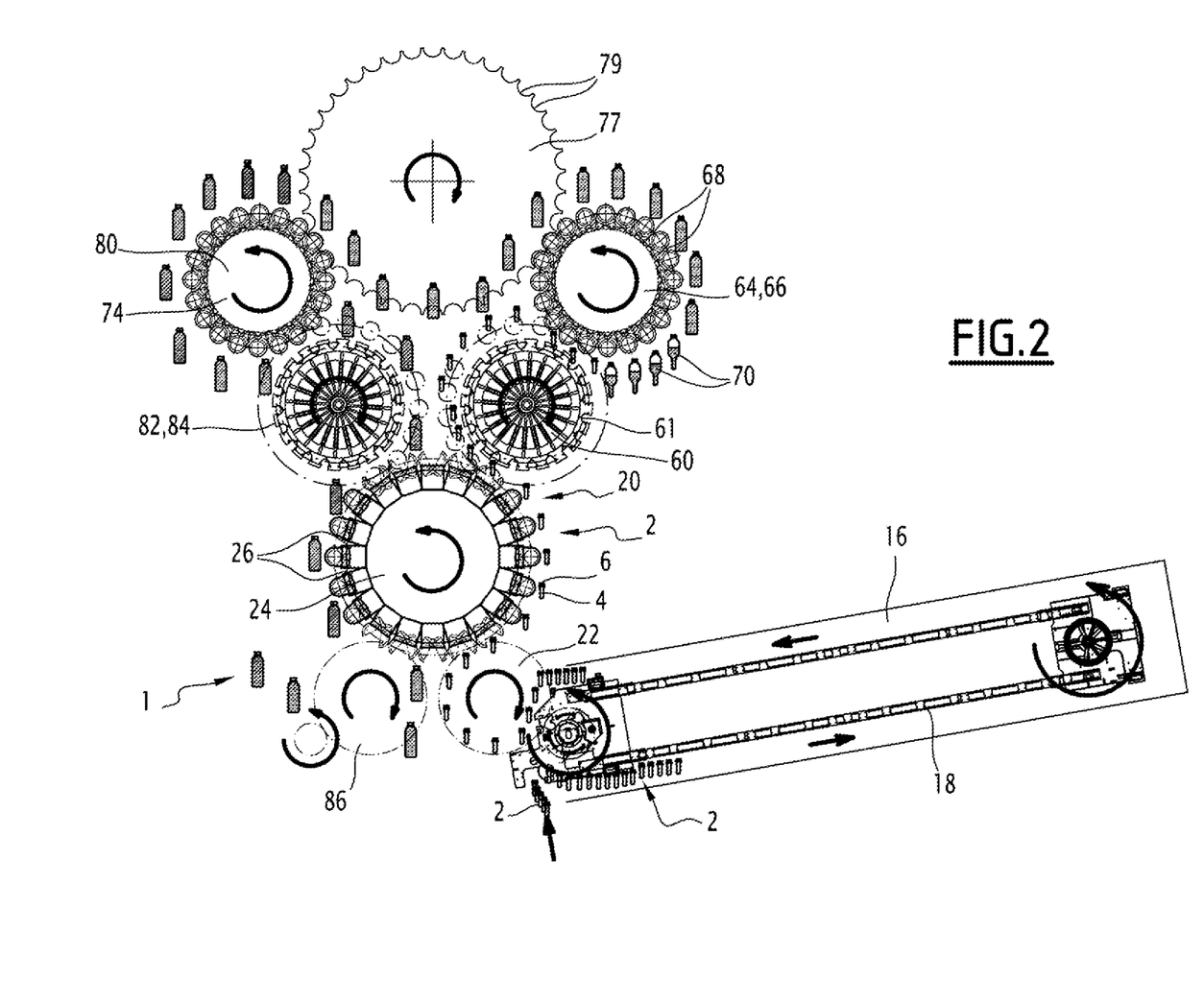
FIG. 2 is a is a diagrammatical view from above of a machine for forming containers according to another embodiment of the invention.

FIGS. 1 and 2 show a machine for producing containers 1, such as bottles, for example sterile or aseptic bottles containing water or carbonated water based drinks, starting from preforms 2.

Figure 4:
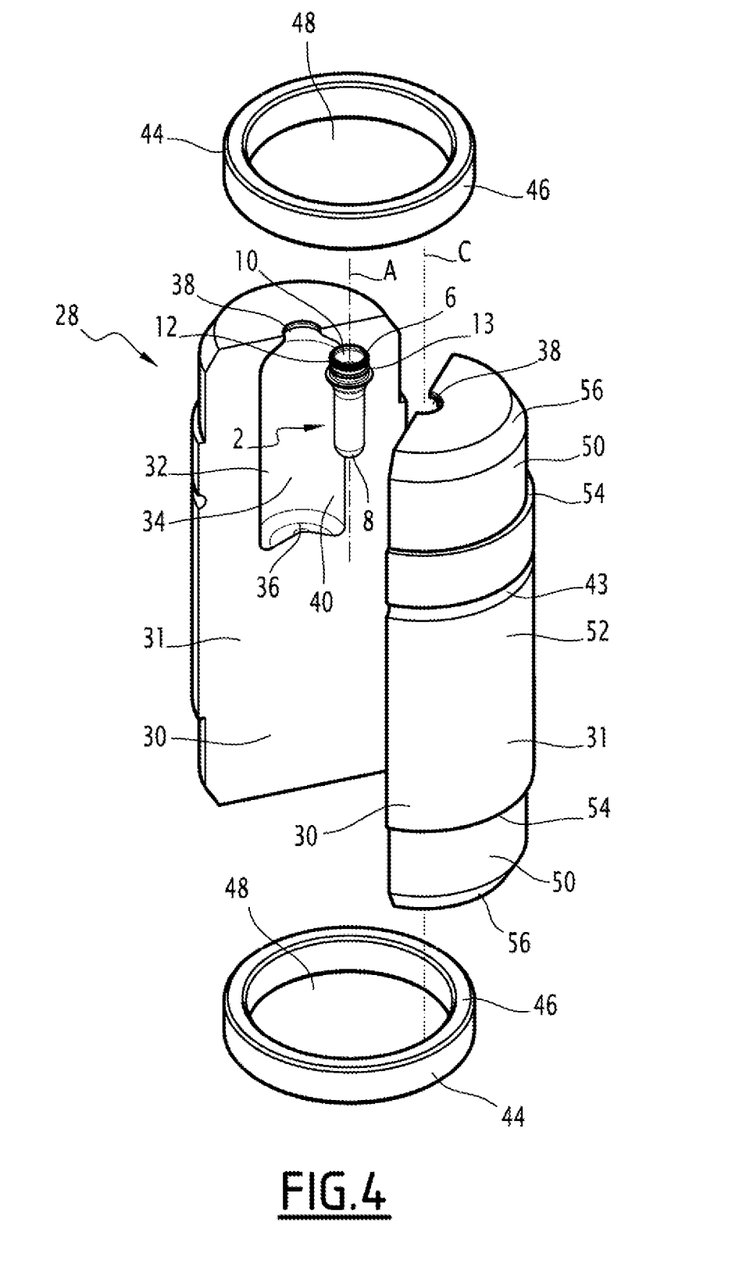
FIG. 4 is diagrammatical view in perspective of a mold in opened configuration used in the machine of FIG. 1 and of a preform placed in the mold.

Each preform 2 may comprise a body 4 in the general shape of a tube of U-shaped longitudinal section, which is closed at one end and the other end of which already has the final shape of the neck 6 of the container 1. In FIG. 4, a preform 2 is shown, by way of non-limiting example, having a cylindrical body 4 extending along a substantially vertical axis A which coincides with the axis of the neck 6. The lower end 8 of the body 4 is closed and has the general shape of a hemisphere, while the upper end of the preform 2 forms the neck 6, which defines an inner opening 10 and which is, in this case, provided with an outer radial part, like a threading 12, adapted to receive a lid or a cap 14, for example by screwing. Below the neck, there is a circular flange 13, that extends radially outwardly from the periphery of the preform 2 and is used to carry the preform or maintain it in the mold.

Successive preforms 2 are introduced in the machine and first undergo a step of heating in a thermal conditioning oven 16, or heating station. In a conventional manner, the preforms 2 are successively loaded on a carrier 18, forming a closed loop, circulating within the oven 16. During the passage of the preforms 2 within the oven, the preforms are continuously heated up to a temperature compatible with its later transformation into a container 1. Such an oven 16 and heating step are conventional in methods and machines for producing containers and will not be described in greater detail here.

At the outlet of the oven 16, or in a variant of the preform production platform or of a treatment station, the preforms are transferred to a mold loading station 20, via a transfer wheel 22, only shown diagrammatically in FIG. 1, adapted to pick up the preforms at said outlet and to carry the preforms 2 to the loading station 20.

Figure 6:
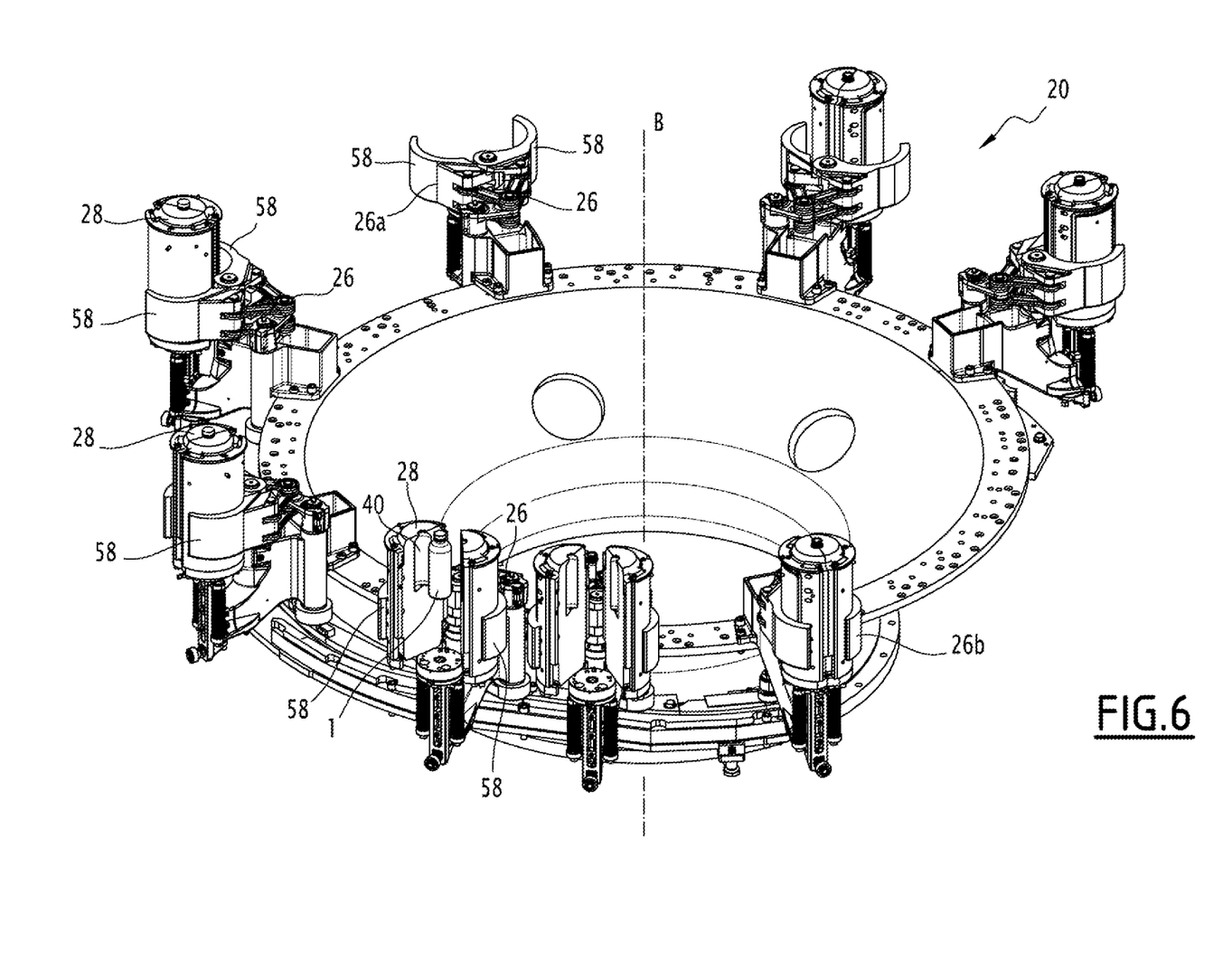
FIG. 6 is diagrammatical view in perspective of the loading station of the machine of FIGS. 1 and 2.

The loading station 20 comprises a wheel 24, or carousel, shown in greater detail in FIG. 6, movable in rotation around an axis B, substantially parallel to the axis A of the preform 2, i.e. a substantially vertical axis B. The wheel 24, carries a plurality of mold holders 26 distributed on the circumference of the wheel 24 and oriented radially towards the exterior of the wheel 24. Each mold holder 26 is intended to receive a mold 28 for forming a container, as will be described hereunder.

Figure 5:
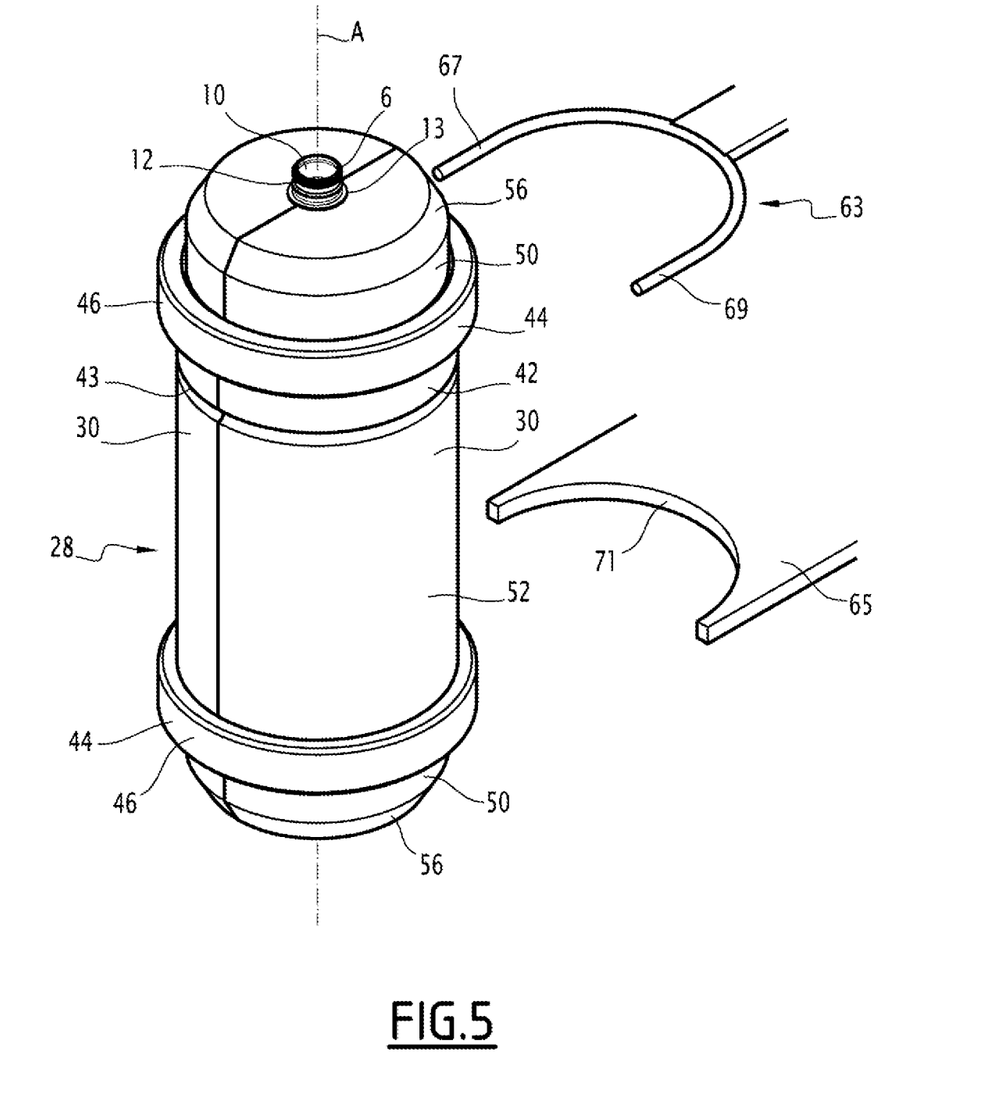
FIG. 5 is diagrammatical view in perspective of the mold of FIG. 3 in closed and locked configuration, said view also showing an imprint as provided at various stations of the machine of FIG. 1.

As shown in FIGS. 4 and 5, a mold 28 comprises two parts 30 movable relative to each other, between an opened configuration (FIG. 4) and a closed configuration (FIG. 5). The two parts 30 are for example hinged together and are movable in rotation relative to each other around an axis C substantially parallel to the axis A of the preform 2. Each part 30 comprises a body 31 comprising a hollow recess 32 having the shape of a half bottle to be formed. According to the non-limiting example shown in FIG. 4, the hollow recess 32 of one part 30 comprises a semi-cylindrical portion 34, closed at its lower end by a bottom surface 36 having a the shape of a semi-circle, and terminated at its upper end by a tapered, then semi-circular opening 38 of a diameter substantially complementary to the half diameter of the body 4 of the preform 2 under the flange 13, in order to maintain the perform below the flange 13. The hollow recess of the other part 30 of the mold 28 is symmetrical to the hollow recess 32 described above.

Preferably, and in a well-known manner, not shown in the drawings, the part of the mold intended to form the bottom of the container 1 is not formed by the bottom surfaces 36 of the recesses 32, but by a separate part, named base mold, which is longitudinally movable with respect to the above mentioned complementary parts when the mold is in the opened configuration, and contains the imprint of the container base. In that case, the hollow recess 32 does not have the shape of a half bottle to be formed but only that of the half wall part of the bottle, its bottom part being excluded.

In the opened configuration, the parts 30 of the mold 28 and the base mold when it is present are separated from each other such that a preform 2 can be introduced between the two parts 30, as shown in FIG. 4, and such that a previously finished container can be removed from the mold.

In the closed configuration, the two parts 30 are applied against each other, such that the hollow recesses 32 face each other and define together a mold cavity 40 having the shape of the container 1 to be formed. If a base mold is present, it is placed in a position such that, when the parts 30 are applied against each other, it contributes to achieve the shape of the container to be formed. The mold cavity 40 therefore comprises a cylindrical portion, defined by the semi-cylindrical portions 34 of the recesses 32 and intended to form the body of the container 1, closed at its lower end by a circular bottom surface, formed either by the bottom surfaces 36 of the recesses 32 or by the base mold and intended to form the bottom of the container 1, and terminated at its upper end by a collar, substantially complementary to part of the body 4 of the preform 2. When the mold is closed, the preform 2 is held in the mold cavity 40 by the opening 38 of the mold cavity. The opening 38 holds the preform 2 just below the flange 13 provided under the neck 6 of the preform, which extends above the opening of the mold cavity 40 outside of said cavity, as shown in FIG. 5. The mold cavity 40 is closed with the preform 2 extending inside the mold cavity. The inner opening 10 defined by the neck 6 of the preform 2 remains accessible as shown in FIG. 4. The outer face 42 of the mold 28 is substantially cylindrical in the closed configuration.

According to the embodiment shown in FIGS. 4 and 5, the outer face 42 of the mold 28 comprises a groove 43 extending all around the outer face 42 and forming a recess in the mold 28. The groove 43 allows the mold 28 to be maintained at various places of the machine, as will be described below.

The mold 28 further comprises locking means 44 arranged to maintain the mold 28 in its closed configuration when the locking means are activated.

The locking means 44 comprise for example at least one ring 46 defining an inner opening 48 having a diameter substantially equal to the diameter of the outer face 42 of the mold 28 in its closed configuration. When the ring 46 is engaged around the mold 28, the periphery of the inner opening 48 is applied against the outer face 42 of the mold and the ring 46 prevents the mold 28 from moving towards its opened configuration, as shown in FIG. 5. By activating the locking means 44, it is meant in this case engaging the ring 46 around the mold 28.

Figure 3:
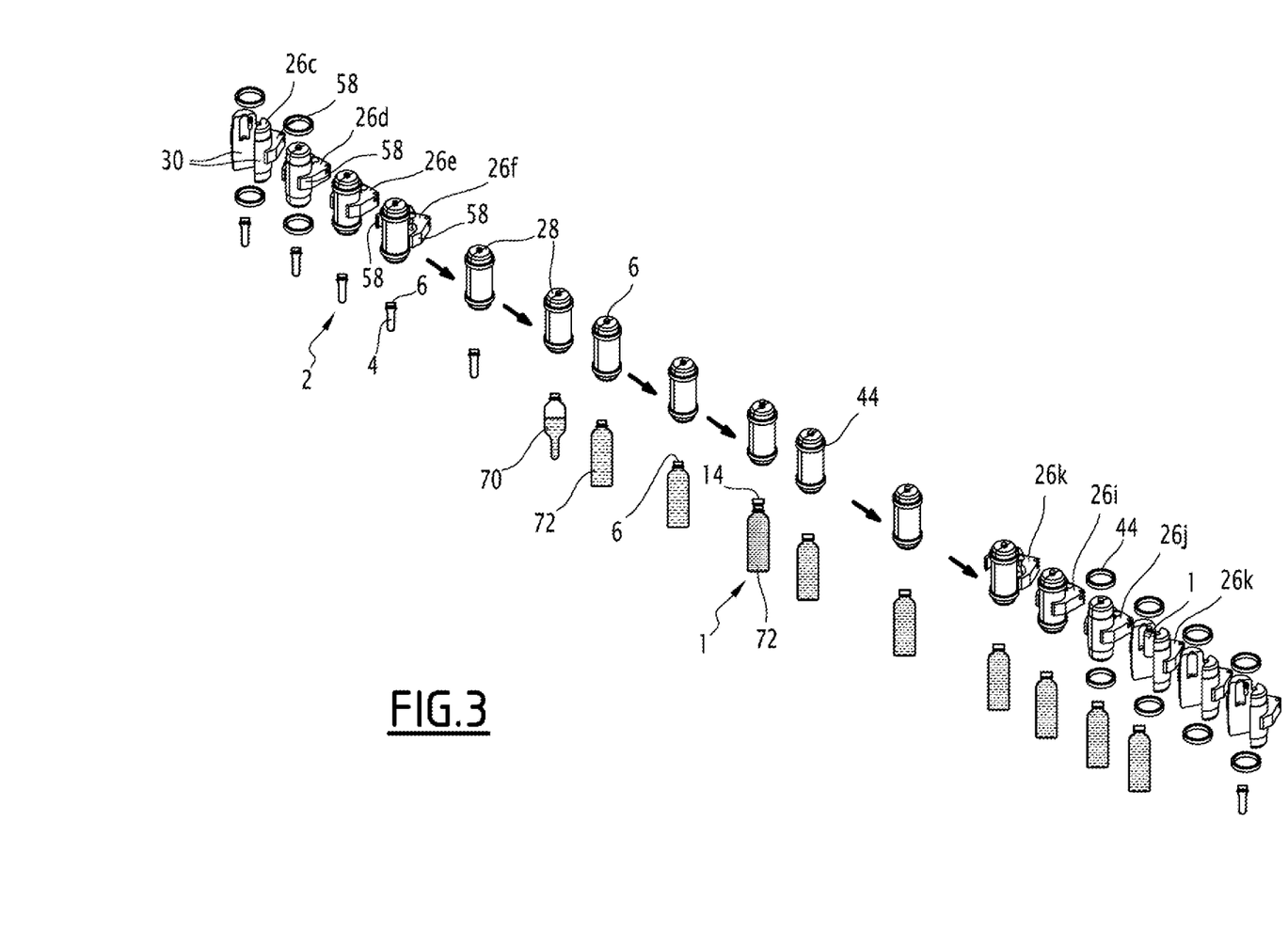
FIG. 3 is a diagrammatical view showing the molds and containers at different stages during the method for forming containers according to the invention.

According to the particular embodiment shown in FIGS. 3 to 5, the locking means comprise an upper and a lower rings 46 and the outer face 42 comprises an upper and a lower areas 50 for respectively receiving the upper and lower rings 46, the inner openings 48 of the lower and upper rings 46 having a diameter substantially equal to that of the upper and lower areas 50. The upper area 50 extends from the upper end of the mold 28, comprising the opening 38, to a central area 52 having a diameter larger than the diameter of the upper area 50, a shoulder 54 joining the central area 52 and the upper area 50, as shown in FIG. 4. Likewise, the lower area 50, having the same diameter as the upper area 50, extends from the lower end of the mold 28 to the central area 52, with a shoulder 54 joining the lower area 50 and the central area 52. When the upper ring 46, respectively the lower ring 46, is engaged on the upper area 50, respectively the lower area 50, for locking the mold 28 in its closed configuration, the upper ring 46, respectively the lower ring 46, comes into abutment against the shoulder 54 to retain the ring 46 around the mold 28, as shown in FIG. 5. The upper and lower areas 50 each further comprise a tapered area 56, joining the upper area 50, respectively the lower area 50, to the upper end, respectively the lower end, of the mold 28. The tapered areas 56 are arranged such that the diameter of the outer face 42 of the mold increases toward the upper and lower areas 50 in order to ease and to guide the engagement of the upper and lower rings 46 on the upper and lower areas 50.

The locking means 44 described above are given by way of non-limiting example. The locking means 44 could be different, for example a retractable pin provided on one part 30 of the mold 28 and engaged in a corresponding housing on the other part in the closed configuration of the mold 28 or disengageable clipping means or any other appropriate disengageable locking means.

In each embodiment, the locking means 44 are carried by the mold 28, at least when the mold is closed and locked.

The groove 43 is for example provided in the central area 52, as shown in FIGS. 4 and 5.

Each mold holder 26 of the loading station 20 is adapted to hold the mold 28 described above. To that end, each mold holder 26 comprises two jaws 58 movable relative to each other between an opened configuration, as shown by the mold holder 26a of FIG. 6, wherein a closed and locked mold 28 can be introduced between the jaws 58, and a closed configuration, as shown by the mold holder 26b of FIG. 6, wherein the jaws 58 are brought closer to each other and wherein the mold 28 is retained between the jaws 58. When the mold holder 26 moves from its opened configuration to its closed configuration, the mold holder 26 also moves the mold 28 it holds to its closed configuration if the mold 28 was in its opened configuration. When the mold holder 26 moves to its opened configuration, it can either also move the mold 28 to its opened configuration via appropriate connection between the mold holder 26 and the mold 28 or leave the mold 28 in its closed configuration, as will be subsequently described. The loading station 20 is arranged to actuate the mold holders 26 between their opened configuration and their closed configuration either via appropriate means provided on the mold holders or via one or several external actuators. The loading station 20 is also arranged to activate the locking means 44 of the molds 28 either via the mold holders 26 or via one or several external actuators. When the locking means 44 comprise rings 46 as described previously, the mold holders 26 or the external actuator(s) are arranged to engage the rings 46 on the molds 28 when said molds 28 are in their closed configuration to lock said molds in their closed configuration. The mold holders 26 or actuator(s) are also arranged to disengage the rings 46 in order to allow the molds 28 to be moved to their opened configuration. The mold holders 26 do not need to lock the molds in the closed configuration, since said locking is performed by the molds themselves. The structure of the mold holders can therefore be simplified and the mold holders can be made more compact, thereby making it possible to increase the number of mold holders on the wheel 22.

Each mold holder 26 receives a mold 28. The mold holder 26 and its mold 28 are in their opened configurations when they are opposite the transfer wheel 22 at the outlet of the oven 16, as shown diagrammatically by mold holder 26c in FIGS. 1 and 3. The successive preforms 2 are loaded in successive molds 28 when said molds are located opposite the transfer wheel 22 and are in their opened configuration 22. The loading of the preforms 2 is for example performed by a robot arm arranged to pick up a preform 2 from the transfer wheel 22 and to place said preform 2 in the opened mold 28 such that the body of the preform 2 extends in the mold cavity 40.

According to a particular embodiment, at least one additional element can be loaded in the mold 28 prior to or in parallel to the loading of the preform 2. The additional element can, for example, be a label which is applied against part of the wall of the mold cavity 40 and which is intended to cover a part of the formed container 1, in order to obtain a labeled container 1 at the outlet of the machine. The additional element could also be another functional or ornamental element to be glued or welded to the container, such as a handle or a grip portion. The shape of the mold cavity is then adapted to receive the additional element.

Prior to loading the preforms 2, the mold cavities 40 can optionally be heated if needed for the forming process of the container. This is the case for example for containers intended to be filled with a hot or warm liquid or in order to maintain the preforms 2 at a temperature adapted for their forming into containers 1. The heating can be performed by contact heat transfer or by powering an electrical power cartridge heater installed in the mold cavities 40.

Once the preform 2 is loaded in the mold 28, the mold 28 is moved to its closed configuration with the mold holder 26 holding it as shown by the mold holder 26d in FIG. 3. The locking means 44 are then activated to lock the mold 28 in its closed configuration as shown by reference 26e in FIG. 3. Meanwhile, the wheel 24 of the loading station 20 rotates to place a subsequent mold holder 26 and its mold 28 opposite the transfer wheel and to allow a subsequent preform 2 to be loaded.

The closed mold holder 26, containing a closed and locked mold 28 containing a preform 2, and optionally an additional element, is moved by the wheel 24 to a transferring station 60, where the mold holder 26 is opened as shown by reference 26f in FIGS. 1 and 3. The mold holder 26 is moved to its opened configuration without opening the mold 28, which remains closed and locked.

The transferring station 60 comprises a wheel 61, movable in rotation around an axis substantially parallel to the axis A of the preform 2, i.e. a substantially vertical axis, and comprising a plurality of imprints opened radially towards the exterior of the wheel 61 and arranged to each receive a closed mold 28 to move it in rotation. The molds 28 are for example guided towards the imprints of the wheel 61 by appropriate guiding means, such as rails and/or a conveyor (not shown), once they are released from the loading station 20 by the opening of the mold holders 26. The molds are maintained in the imprints for example by an arcuate rail (not shown) extending around a part of the wheel 61 such that the molds 28 move in rotation with the wheel.

The imprints of the wheel 61 are for example each formed by a fork 63 and an abutment 65, as shown in FIG. 5. The fork 63 comprises two arms 67 and 69 extending substantially radially from the wheel 61 and spaced from each other by a distance substantially equal to the diameter of the groove 43 of the mold 28. Therefore, the two arms 67 and 69 are able to hold the mold 28 vertically and radially when they are engaged in the groove 43. At the transferring station 60, each mold 28 is pushed toward the wheel 61 and the arms are naturally engaged in the groove 43. The abutment 65 also extends radially from the wheel 61 and comprises a surface 71 having a shape substantially complementary of part of the outer face 42 of the mold 28. When the fork 63 is engaged in the groove 43, the outer face 42 of the mold 28 rests and the surface 71, which holds the mold 28 axially, i.e. which prevents the mold 28 from being tilted in the wheel 61.

The imprints described above are given by way of example and other means for holding the molds 28 vertically and radially on the wheel could be foreseen. It should be noted that the imprints are fixed relative to the wheel 61 and do not need to be actuated, which limits the space required for each imprint on the wheel.

At the transferring station 60, the pitch, i.e. the distance, between two successive molds 28 is reduced by providing imprints that are closer from each other on the wheel 61 than the mold holders 26 of the loading station 20. The pitch can be reduced because the molds 28 are no longer held by mold holders 26 which require space to allow the movement of the jaws 58. By reducing the pitch between successive molds, it is possible to increase the throughput of the machine, without increasing the speed of rotation of the various wheels of the machine.

From the transferring station 60, the molds 28 are moved to a forming station 64 comprising a wheel 66, movable in rotation around an axis substantially parallel to the axis A of the preform 2, i.e. a substantially vertical axis, and comprising a plurality of imprints 68 opened radially towards the exterior of the wheel 66 and arranged to each receive a closed and locked mold 28 to move it in rotation. The imprints 68 are for example each formed by a fork 63 and an abutment 65, as described previously in relation with the transferring station 60. The molds 28 are for example guided towards the imprints of the wheel 61 by appropriate guiding means, such as rails and/or a conveyor (not shown), when the molds 28, in the transferring station 60, are located opposite the wheel of the forming station 64. The molds are maintained in the imprints for example by an arcuate rail (not shown) extending around a part of the wheel 66 such that the molds 28 move in rotation with the wheel.

The forming station 64 comprises means for injecting a gaseous or liquid fluid in the preforms 2 held by the molds 28. Such means are known per se and will not be described in detail herein. In the case of hydraulic forming as shown in the drawings, the injecting means are for example arranged to inject water in the preforms 2, which are deformed and acquire the shape of the mold cavity 40, i.e. the shape of the containers 1 to be produced, as shown by references 70 and 72 in FIGS. 1 and 3.

At the forming station 64, the pitch between successive molds 28 is the same as in the transferring station 60.

In the case of hydraulic forming, after the forming step, the molds 28, now each containing a formed and filled container 1, are moved to a closing station 74.

According to the embodiment shown in FIG. 1, the transfer to the closing station 74 is performed for example by an endless belt 76 forming successive imprints 78 and arranged to move the molds 28 in translation, as shown by arrow F of FIG. 1. The imprints 78 are for example each formed by a fork 63 and an abutment 65, as described previously in relation with the transferring station 60. In this case, the filled containers 2 exit the forming station 64 according to a direction tangential to the wheel 66, which limits the acceleration imparted on the containers and prevents a brutal change in the centrifugal force imparted on the containers, thereby limiting the constraints applied on the containers and limiting the risks of spilling or of breakage of the containers.

According to the embodiment shown in FIG. 2, the transfer is performed by a wheel 77, movable in rotation around an axis substantially parallel to the axis A of the preform 2, i.e. a substantially vertical axis, and comprising a plurality of imprints 79 opened radially to-wards the exterior of the wheel 77 and arranged to each receive a closed and locked mold 28 to move it in rotation. The imprints 79 are for example each formed by a fork 63 and an abutment 65, as described previously in relation with the transferring station 60. In this case, the machine is more compact and requires less space than the machine according to the embodiment of FIG. 1.

The closing station 74 comprises a wheel 80, movable in rotation around an axis substantially parallel to the axis A of the preform 2, i.e. a substantially vertical axis, and comprising a plurality of imprints opened radially towards the exterior of the wheel 80 and arranged to each receive a closed and locked mold 28 to move it in rotation. The imprints of the wheel 80 are for example each formed by a fork 63 and an abutment 65, as described previously in relation with the transferring station 60. The closing station 74 comprises means for screwing a lid or a cap 14 on the neck 6 of each container 2 protruding outside of the mold 28. Such means are known per se and will not be described in detail herein.

Once the containers 1 are closed, the molds 28 containing the closed containers are moved to another transferring station 82, which comprises a wheel 84, movable in rotation around an axis substantially parallel to the axis A of the preform 2, i.e. a substantially vertical axis, and comprising a plurality of imprints opened radially towards the exterior of the wheel 84 and arranged to each receive a closed mold 28 to move it in rotation.

The transferring station 82 is arranged to move the molds 28 to the loading station 20, which also forms an unloading station for the containers 1, as will be described subsequently.

At the transferring station 82, the pitch between successive containers 1 is increased to correspond to the pitch between two successive mold holders 26 of the loading station 20.

At the loading station 20, once a mold holder 26 has moved to its opened configuration opposite the first transferring station 60 to release a mold 28, it remains open and continues its rotation as shown by reference 26g in FIG. 1. The mold holder 26 in its opened configuration rotates until it is located opposite the second transferring station 82 where a mold 28, containing a container 1, is transferred between its jaws 58, as shown by reference 26h in FIGS. 1 and 3. The mold holder 26 is moved to its closed configuration to retain the mold 28, as shown by reference 26i in FIGS. 1 and 3.

The locking means 44 are then deactivated by the loading station 20, i.e. the rings 46 are removed from the mold 28 in the embodiment shown in the figures, as shown by reference 26j in FIG. 3.

The mold holder 26 is then reopened, i.e. moved from its closed configuration to its opened configuration, along with the mold 28 retained by said mold holder 26, i.e. the mold 28 also moves from its closed to its opened configuration as shown by reference 26k in FIGS. 1 and 2. The formed container 1 can then be retrieved from the mold 28, for example by a robot arm at a transfer wheel 86.

The mold holder 26 holding the mold 28 in its opened configuration continues its rotation until it is located opposite the transfer wheel 22, where it receives a new preform 2.

Optionally, at the loading and unloading station 20, means for picking up a mold 28 can be provided in order to move a mold towards a cleaning station in case of accidental container leakage.

As described above, the preforms 2 and then the formed containers 1 are moved in the machine within a closed and locked mold 28, the mold 28 being moved between the various stations of the machine. The preforms 2 and containers 1 are therefore no longer carried by their neck only and are thus not subjected to distortions or breakage. The preforms and containers within the molds 28 can sustain greater rotation speeds and centrifugal forces.

The mold loading and unloading station 20 is distinct from the forming station 64. In other words, the forming station 64 is dissociated from the mold loading and unloading station 20, which allows to reduce the pitch between successive molds 28 at the forming station and therefore to increase the throughput of this station at constant rotation speed. Furthermore, in the case of hydraulic forming, the containers are filled with the forming liquid outside mold holders 26, which eliminates the risk of soiling the mold holder 26, which are difficult to clean up, in case of spilling of the forming liquid.

The machine and method described above were given by way of example and various modifications can be foreseen in the machine.

The machine has been described for a hydraulic forming method of the containers. In case of compressible gas forming, the machine remains substantially identical, except that the forming station 64 is equipped with means for injecting gas, possibly with an axial stretching rod, in the containers 1 instead of liquid injecting means. Furthermore, a supplementary station is provided for filling the formed containers.

In the machine, the closing station is optional and closing of the containers can be performed outside the machine. In this case, the second transferring station 82 may be suppressed and the transfer of the molds 28 from the forming station to the unloading station 20 can be carried out by the first transferring station 60. The machine enables the production of filled, capped and optionally labeled containers at a higher throughput than conventional machines, while limiting the risks of containers distortions, spilling and leakage.

The invention claimed is:

1. A method for producing containers from preforms, the method comprises the following steps:
loading the preforms successively into molds on a first wheel at a mold loading station, the molds having a mold cavity defining an external shape of the container to be produced, the molds each including at least two mold pieces moveable between an open position and a closed position;

removing the molds in the closed position from the first wheel while containing the preforms from the mold loading station;

transferring the molds in the closed position while containing the preforms from the first wheel of the mold loading station to a second wheel of a container forming station, the container forming station being distinct and separate from the mold loading station; and at the forming station, injecting one of a gaseous or liquid fluid into the preforms causing the preforms to expand and acquire the shape of a container defined by a mold cavity of each the molds.

2. The method according to claim 1, wherein the steps of removing and transferring the molds are performed at a transferring station, the method further comprising reducing a first pitch of the molds at the loading station to a second pitch of the molds at the transferring station.

3. The method according to claim 1, further comprising closing the molds in the mold loading station after the loading of preforms into the molds.

4. The method according to claim 1, further comprising heating the molds prior to the step of loading the preforms into the molds.

5. The method according to claim 1, further comprising transferring the molds in the closed position from the second wheel while containing the containers from the container forming station.

6. The method according to claim 5, wherein the molds in the closed position are transferred from the container forming station to the first wheel.

7. The method according to claim 6, further comprising transferring the molds in the closed position while containing the containers from the second wheel of the container forming station to a mold unloading station of the first wheel, and subsequently opening the molds and unloading the containers from the molds in the unloading station portion.

8. The method according to claim 7, wherein the mold unloading station and the mold loading station are associated with the first wheel.

9. The method according to claim 7, wherein the unloading of the containers and the loading of the preforms occurs while an individual mold is held in a single mold holder.

10. The method according to claim 7, wherein the mold loading station includes a plurality of mold holders and further comprises successively moving the mold holders between a first mold holder open position, a first mold holder closed position, a second mold holder open position and a second mold holder closed position.

11. The method according to claim 10, wherein the step of loading preforms into the molds is performed when the mold holders are in the first mold holder open position.

12. The method according to claim 10, wherein the step of unloading containers from the molds is performed while the mold holders are in the first mold holder open position.

13. The method according to claim 10, wherein the step of transferring the molds in the closed position while containing the preforms from the mold loading station to a container forming station is performed while the mold holders are in the second mold holder open position.

14. The method according to claim 10, wherein the step of transferring the molds in the closed position while containing the containers from the container forming station to the mold unloading station is performed while the mold holders are in the second mold holder open position.

15. The method according to claim 7, further comprising, before the step of transferring the molds to the mold unloading station, applying a fluid tight closure to the container.

16. The method according to claim 5, wherein the molds are transferred from the forming station to a closing station, in the closing station the method further comprising applying a fluid tight closure to the container thereby closing the container.

17. The method according to claim 16, wherein the molds are transferred from the closing station to the mold loading station.

18. The method according to claim 1, further comprising, after the injecting step, applying a fluid tight closure to the container.

19. The method according to claim 18, wherein the applying step occurs while the container is in the mold.

20. The method according to claim 1, further comprising applying a fluid tight closure to the container while the container is in the mold.

* * * * *